United States Patent [19]

Mordarski

[11] 4,235,673
[45] Nov. 25, 1980

[54] CHIP SLEEVE FOR NUCLEAR FUEL ELEMENTS

[75] Inventor: Walter J. Mordarski, Wallingford, Conn.

[73] Assignee: Combustion Engineering, Inc., Windsor, Conn.

[21] Appl. No.: 868,868

[22] Filed: Jan. 12, 1978

[51] Int. Cl.$^2$ .............................................. G21C 3/20
[52] U.S. Cl. ........................................ 176/82; 176/68
[58] Field of Search ...................... 176/67, 68, 82, 72, 176/81, 86; 242/7.02, 7.23; 138/130

[56] References Cited

U.S. PATENT DOCUMENTS

| | | | |
|---|---|---|---|
| 3,067,116 | 12/1962 | Kittel et al. | 176/82 |
| 3,291,699 | 12/1966 | Trickett et al. | 176/68 |
| 3,297,540 | 1/1967 | Williams et al. | 176/68 |
| 3,334,019 | 8/1967 | Bogaardt et al. | 176/68 |
| 3,387,148 | 6/1968 | Janner et al. | 176/68 |
| 3,801,447 | 4/1974 | Heenan | 176/68 |
| 3,900,358 | 8/1975 | Bujas et al. | 176/82 |
| 3,928,130 | 12/1975 | Pawliw et al. | 176/67 |
| 3,944,468 | 3/1976 | Duret et al. | 176/81 |
| 3,994,778 | 11/1976 | Grover et al. | 176/68 |

FOREIGN PATENT DOCUMENTS

| | | | |
|---|---|---|---|
| 1267499 | 5/1968 | Fed. Rep. of Germany | 176/82 |
| 1445884 | 6/1966 | France | 176/72 |
| 1057857 | 2/1967 | United Kingdom | 176/82 |

*Primary Examiner*—Harvey E. Behrend

[57] ABSTRACT

Means for preventing chip penetration of fractured ceramic fuel into the cladding of a fast spectrum nuclear reactor fuel element is disclosed. Included in the fuel element external to the pellet column but internal of the cladding is a woven cylinder or web of fine wire or of bandage wrapped metallic ribbons. The cylindrical web acts to retain ceramic chips in their positions so that they do not become lodged between the pellets and the clad: which condition could lead to clad failure.

10 Claims, 4 Drawing Figures

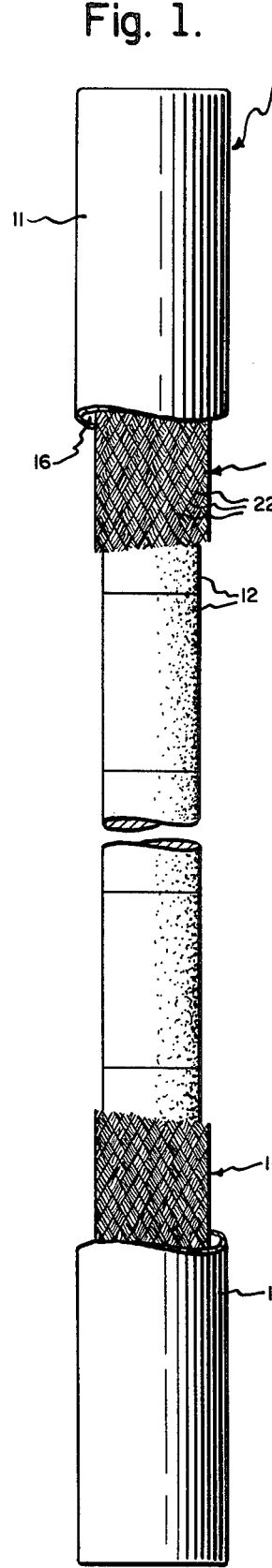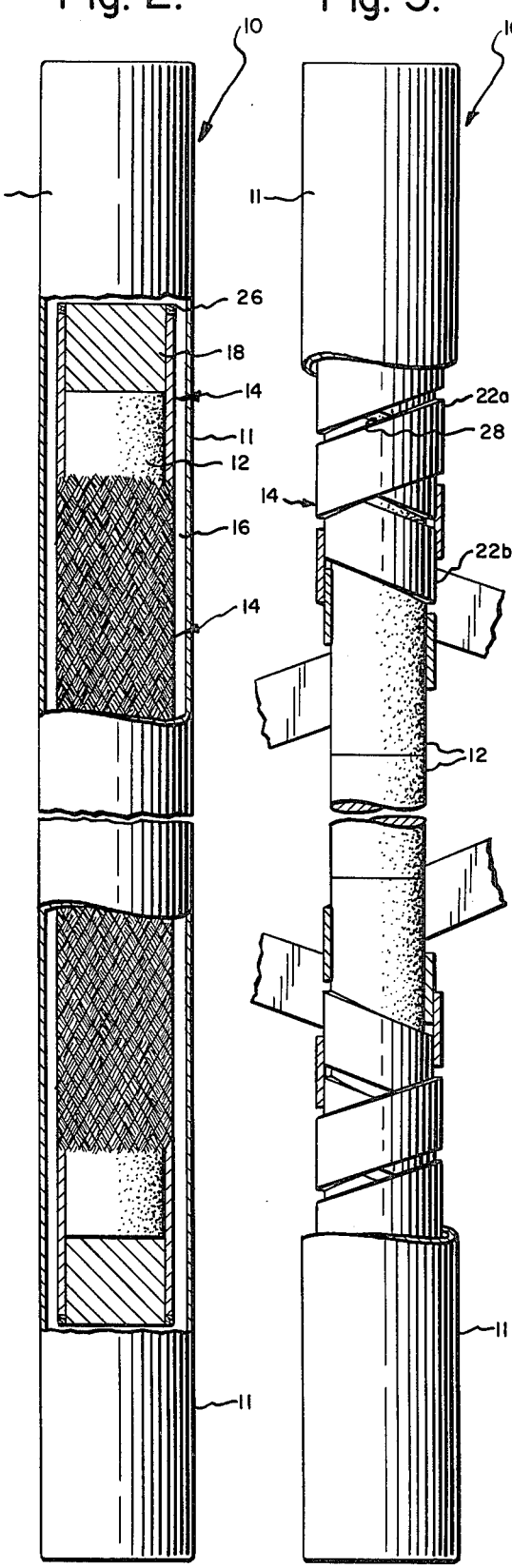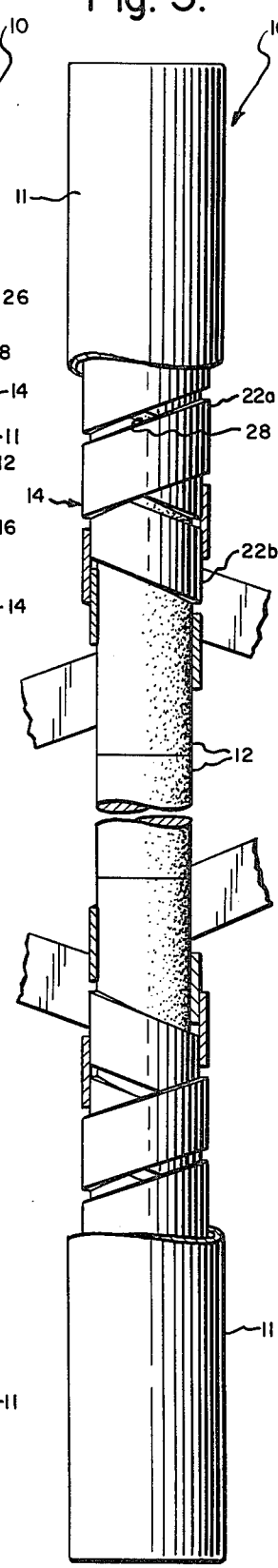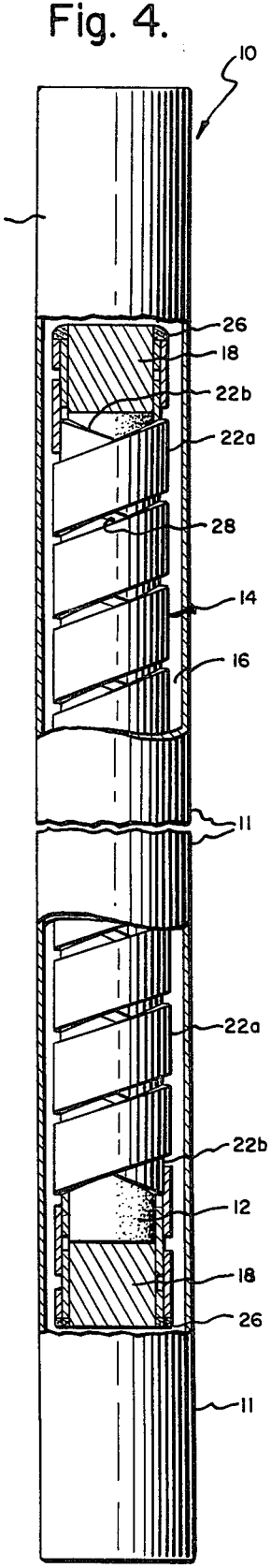

CHIP SLEEVE FOR NUCLEAR FUEL ELEMENTS

BACKGROUND OF THE INVENTION

This invention relates to an improved fuel element for fast spectrum nuclear reactors. More particularly, the invention relates to a fuel element having means for protecting the cladding against damage thereto from ceramic chips which may be expected to chip off of the fuel pellets internal of the cladding.

Conventional fast breeder reactor fuel elements consist of ceramic fuel pellets stacked in a column and inserted into a metal tube or cladding such as stainless steel which is welded closed with metallic end plugs. Due to the high temperature at which fast reactors operate, it is essential to have efficient heat transfer between the nuclear fuel and the cladding. For this reason, it has been customary to place in the intervening space a heat transfer agent such as sodium or some other metal that is liquid at reactor operating temperatures. Such a fuel element is referred to as a "sodium bonded" fuel element.

During operation of the reactor, substantial thermal stresses are caused by periodic heating and cooling of the reactor. These thermal stresses may produce cracks in the ceramic fuel pellets. When this happens, small pellet chips may become wedged between the larger chips and the clad. As the fuel pellets subsequently swell due to fission product buildup, these small chips are driven into the clad producing localized high stresses and localized points of weakness. It is believed that these localized effects caused by sandwiching the small chips between the swelled fuel pellet and the clad is one cause of clad failure. Such failure may release radioactive fission products to the coolant circulating around the fuel element and through the reactor system: a result which obviously should be avoided.

In order to address the cladding failure problem originating from chips of fuel pellets being pressed into the cladding by the swelling pellets, the conventional solution of placing a very thin-walled tube (approximately 0.003 inches) with a very small tube to pellet diametral clearance (less than 0.003 inches) within the annular region between the pellets and cladding was devised. However, in order to provide for ingress of the bonding sodium, it usually is necessary to puncture the thin-walled tube prior to pellet loading to form a series of small perforations.

The above described solution has not been without its difficulties. It has been found that the fabrication and assembly of such a fuel element is both difficult and expensive. The tight specifications required for the thin-walled tubing are not easily or inexpensively met. Further, the task of loading the pellets into the thin-walled tubing with such a small diametric clearance between the pellets and the tube itself, has proven to be extremely difficult. Finally, it has been discovered that the above described solution is less than adequate since the small perforations serve as sources for crack initiation and propagation with consequent loss of restraint capability.

U.S. Pat. No. 3,067,116 discloses an approach similar to that described above in which the column of pellets are wrapped lengthwise with a thin sheet of pre-slit metal. The claimed purpose for such thin sheet pre-slit material is to provide a spacer which functions to maintain the space between the fuel pellet and the cladding itself. In the form disclosed, however, the spacer has been found to be less than effective as a pellet chip restrainer since the wrapped configuration did not provide a circumferentially continuous cylindrical sleeve but provided a sleeve with a sliced area or an overlapping area where the opposite edges of the thin-sheet material meet. Additionally, the pre-formed slits in the thin-sheet material provide abundant sites for the beginning and propagation of cracks: which cracks serve to prevent the sheet of material from acting as an effective chip restraint device.

SUMMARY OF THE INVENTION

The present invention overcomes the problems experienced by the conventional and prior approaches to providing a chip restraint device on the interior of the nuclear fuel element cladding. These prior problems have been surmounted by an improved nuclear reactor fuel element of the type having a column of stacked cylindrical fuel pellets surrounded and enclosed by a cylindrical metal cladding tube sealed at both ends and with a circumferentially uninterrupted cylindrical web formed of continuous filaments intermediate the column and the cladding. The continuous filaments may alternatively comprise strands of fine wire or thin metallic ribbons. In the former instance, the fine wire filaments are woven into a cylindrical web and in the latter the metallic ribbons are cylindrically wound in bandage wrap fashion to form the web. In either case, the cylindrical web is fabricated in such a manner as to include a plurality of small openings therethrough whereby the heat conductive fluid such as liquid sodium is permitted ingress into and egress from the web's interior, thereby thermally bonding the fuel pellets to the fuel element cladding.

The difficulties and expenses of fabrication inherent in the previous conventional practice are alleviated by the present invention in that the cylindrical web, albeit formed of fine woven wires or of bandage wrapped metallic ribbons, are easy to manufacture by known manufacturing techniques. Additionally, such cylindrical webs may be easily and quickly loaded with a column of fuel pellets while in a relaxed condition with an interior diameter opening significantly greater than the diameter of the fuel pellets themselves. Subsequently, the cylindrical web may be tensioned by pulling at each end and fastened in its tensioned state. Tensioning the cylindrical web causes the web to reduce its diameter so that it exerts an inwardly supporting pressure such as is found in the well known "Chinese Fingertrap." Finally, the uninterrupted cylindrical web of continuous filaments provides no local areas in which cracks may begin so that the web of the present invention is less prone to the previously experienced problem of crack initiation and propagation.

In a preferred embodiment, the material from which the continuous elements are formed consists of a material which is softer than the material of the cladding so that in the event that a fuel pellet chip does become lodged between a fuel pellet and the cladding, the subsequent swelling of the fuel pellet will simply press the chip into the material of the deformable cylindrical web without either being pressed itself into the cladding or pressing the filaments of the cylindrical web into the cladding.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIGS. 1 and 2 are representations of the invention in which a fuel element is shown with a circumferentially uninterrupted cylindrical web formed of continuous fine woven wires intermediate the column of pellets and the cladding; and FIGS. 3 and 4 are representations similar to those of FIGS. 1 and 2 with the cylindrical web formed of bandage wrapped metallic ribbons.

DESCRIPTION OF THE PREFERRED EMBODIMENT

While the invention is susceptible of various modifications and alternative constructions, there is shown in the drawings and there will hereinafter be described, in detail, a description of the preferred embodiments of the invention. It is to be understood however, that the specific description and drawings are not intended to limit the invention to the specific forms disclosed. On the contrary, it is intended that the scope of this patent include all modifications and alternative constructions thereof falling within the spirit and scope of the invention as expressed in the appended claims to the full range of their equivalence.

FIGS. 1 and 2 generally illustrate a first embodiment of the invention which relates to the design of a nuclear reactor core element. FIGS. 3 and 4 also generally illustrate a second embodiment of the invention. While the present invention applies equally as well to either a fuel element or a burnable poison element, the following description will be made in the context of a fuel element. However, such a description is not intended to limit the scope of the claimed invention in any way.

Reactor core fuel element 10 consists of a plurality of cylindrical fuel pellets 12 stacked to form a column. Pellets 12 are surrounded by a cylindrical web 14 which in turn is surrounded by the element cladding 11. The annular space 16 between the pellets 12 and the cladding 11 is also typically filled with a heat exchange medium such as sodium which is liquid at reactor operating temperatures. End plugs 18 are positioned at each end of the stack of pellets 12 and may consist of a material such as stainless steel or zircaloy.

Cylindrical web 14 is a circumferentially uninterrupted tube formed of continuous filaments 22. In the embodiment shown in FIGS. 1 and 2, the continuous filaments 22 comprise a multiplicity of strands of fine wire 24 woven into a cylindrical sheath. In the embodiment shown in FIGS. 3 and 4 the continuous filaments comprise a pair of metallic ribbons 22a, 22b which are helically wound in opposite directions in a bandage wrap fashion around the column of pellets 12. Such ribbons 22a, 22b may also be helically wound in a basket weave to form the cylindrical web 14. Typical metallic ribbons may consist of stainless steel with a thickness of 0.002 inches and a width of 0.250 inches. In either case, the resultant cylindrical web 14 is of such a nature as to permit radial expansion of its central opening when the web is axially relaxed, or indeed, axially compressed. On the other hand, each of the webs 14 of the embodiments shown radially contract when stretched in their axial directions.

Thus, in a manner similar to the well known "Chinese Fingertrap", placing web 14 under tension causes it to exert an inwardly directed force along its entire length. This feature is used to good advantage by the present invention. During the manufacture of the fuel element 10, opposite ends of web 14 are drawn apart and welded or fixed to the end plugs 18 at weld 26 with the effect that web 14 snugly embraces pellets 12 throughout their outwardly facing cylindrical surfaces. The resulting inwardly directed girdling forces tend to hold any pellet chips which may form, in their places so that they do not tend to fall into the annulus 16 intermediate pellets 12 and the cladding material 11. In addition, the material from which web 14 is formed may desirably be softer than the material of the cladding 11 (typically stainless steel) so that, in the event that a pellet chip does become lodged between the cladding 11 and one of the pellets 12, subsequent fission product accumulation induced swelling of the pellet would merely force the chip into the material of web 14 rather than into the clad 11 or rather than causing a portion of web 14 to be forced into the clad.

Both of the webs of the above described embodiments which, incidentally, are generally commercially available, are sufficiently porous to permit the passage therethrough of the liquid thermal bonding substance so as to adequately thermally "bond" the fuel pellets 12 to the clad 11. In the case of the woven wire sleeve of FIGS. 1 and 2, the woven mesh contains interstices through which the bonding liquid may pass. In the case of the bandage wrapped metallic ribbons, stretching the web 14 prior to its fixation to end plugs 18 causes the helical bias wrap to open up slightly to form "windows" 28 through which the bonding liquid may pass.

It is evident that, with either of the above described embodiments, significant advantages may be obtained. The continuous nature of the filaments 22 of both embodiments eliminates the formation of local sites at which crack initiation and propagation is likely to occur. Both of the embodiments utilize inexpensive and easily obtained webs which are porous to bonding liquids and which provide inwardly directed chip restraining forces when they are held in a tensioned condition. Additionally, the webs of the present invention more easily accommodate uneven fuel element swelling caused by uneven fuel burnup than did prior sleeve designs. Finally, the fabrication of the fuel or poison elements is significantly facilitated due to the fact that loading the pellets into the webs is easily accomplished by virtue of the fact that the cylindrical webs expand when axially relaxed and contract when axially tensioned. Thus, the pellets are "loaded" into the cylindrical webs when they are relaxed. Then the webs are placed under tension and welded to the end plugs to squeeze the pellet column which is subsequently loaded as a unit into the external clad 11.

What is claimed is:

1. An improved nuclear reactor core element of the type having a column of axially stacked cylindrical pellets surrounded and enclosed by a cylindrical metal cladding tube, the improvement comprising:

a circumferentially uninterrupted cylindrical web confining said column of pellets and spaced at all points from said cladding to provide an annular gap between said web and said cladding, said web being formed of a plurality of discrete, overlapping, continuous filaments at least some of which are helically wound about and extend over the entire axial length of said column, said overlapping filaments forming radial openings therebetween whereby portions of the outer surface of the pellets are in fluid communication with the environment external to the web; and fastening means at each end of said column to which are attached the filaments that extend over the entire length of said column, the attached filaments thereby being maintained in an axially tensioned condition whereby the web exerts an inward girdling force over the outer surface of said column.

2. The improved nuclear reactor core element as recited in claim 1 wherein said cylindrical web comprises woven strands of fine wire.

3. The improved nuclear reactor core element as recited in claim 1 wherein said cylindrical web comprises a helically wound metallic ribbon.

4. The improved nuclear reactor core element as recited in claim 1 wherein said cylindrical web comprises first and second metallic ribbons cylindrically wound in bandage wrap fashion in opposite directions.

5. The improved nuclear reactor core element as recited in claim 6 wherein said element includes a heat conductive fluid within said cladding and wherein said cylindrical web includes small openings therethrough formed between said first and second metallic ribbons whereby said heat conductive fluid is permitted ingress into and egress from the interior of said cylindrical web.

6. The improved nuclear reactor core element as recited in claim 1 wherein said continuous filaments comprise a material which is softer than the material of said cladding.

7. The improved nuclear reactor core element as recited in claim 1 wherein said core element is a fuel element with fuel pellets.

8. The improved nuclear reactor core element as recited in claim 3 wherein said metallic ribbon is cylindrically wound in bandage wrap fashion.

9. The improved nuclear reactor core element as recited in claim 1 wherein said core element is a poison element with burnable poison pellets.

10. An improved nuclear reactor core element as recited in claim 1 wherein said element includes a heat conductive fluid within said cladding intermediate said cladding and said pellets.

* * * * *